Oct. 9, 1956 L. NIXON 2,765,753
ATTACHMENT FOR CONVEYOR SYSTEM LINE
Filed Nov. 5, 1953 4 Sheets-Sheet 1

Oct. 9, 1956 L. NIXON 2,765,753
ATTACHMENT FOR CONVEYOR SYSTEM LINE
Filed Nov. 5, 1953 4 Sheets-Sheet 4
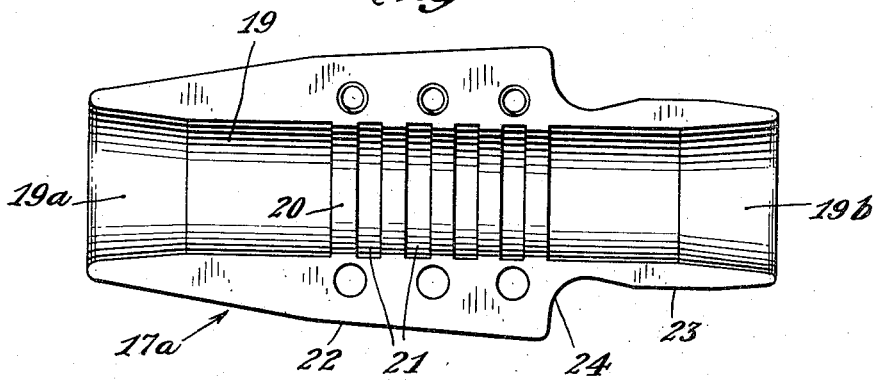
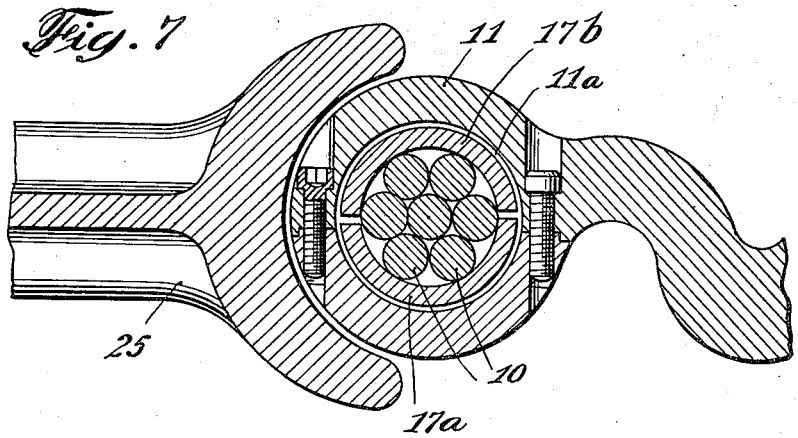
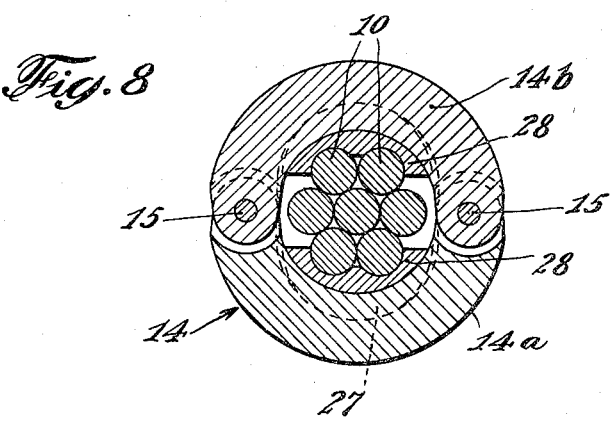

United States Patent Office 2,765,753
Patented Oct. 9, 1956

2,765,753

ATTACHMENT FOR CONVEYOR SYSTEM LINE

Leroy Nixon, Newtown, Pa., assignor to John A. Roebling's Sons Corporation, Trenton, N. J., a corporation of Delaware Application November 5, 1953, Serial No. 390,290

12 Claims. (Cl. 104—180)

This invention relates to line or cable conveying systems and more particularly to an arrangement for attaching a load to the line for the purpose of supporting as well as hauling the same.

Such conveying systems may be constructed for operation at ground level as well as at a relatively high level above the ground and often over extremely difficult terrain. In such systems the line or cable may be used to haul or support the load or both. Therefore, in addition to the usual maintenance problems and dangers of breakdown there is the added hazard of making repairs under adverse conditions. It is apparent that minimization of wear on the various elements of the system such as support rollers, sheaves, lines and the like is essential.

It is, therefore, an object of the present invention to provide an attachment to the line of such conveyor systems by means of which the hanger for bearing the load may be connected to the line in such manner that damage to or breakage of the line as well as normal wear thereof is substantially reduced over an extended period of use.

Another object is the provision of such an attachment which in operation conforms substantially to the revolving elements of the conveying system and substantially reduces wearing of both the running line and the fixed rotating elements.

A further object is the provision of such an attachment which permits the line with a load carrying hanger attached thereto to pass over, under and around sheaves with little or substantially no shock thereto and with the impact of the attachment and hanger on the sheaves reduced to a minimum.

Still another object is the provision of such an attachment which may readily be attached to and removed from the line, and which may be readily moved from one position to another on the line thereby permitting distribution along the line of the wear from repeated flexing.

Additional objects as well as advantages of the present invention will be apparent from the following description and drawing in which:

Figure 4 is a sectional view taken along the lines 4—4 of Figures 1 and 2;

Figure 6 is an elevational view corresponding to a sectional view taken along the line 6—6 of Figure 4;

Figure 7 is a sectional view taken along the lines 7—7 of Figures 1 and 2; and

Figure 8 is a sectional view taken along the line 8—8 of Figure 1.

Figure 1:
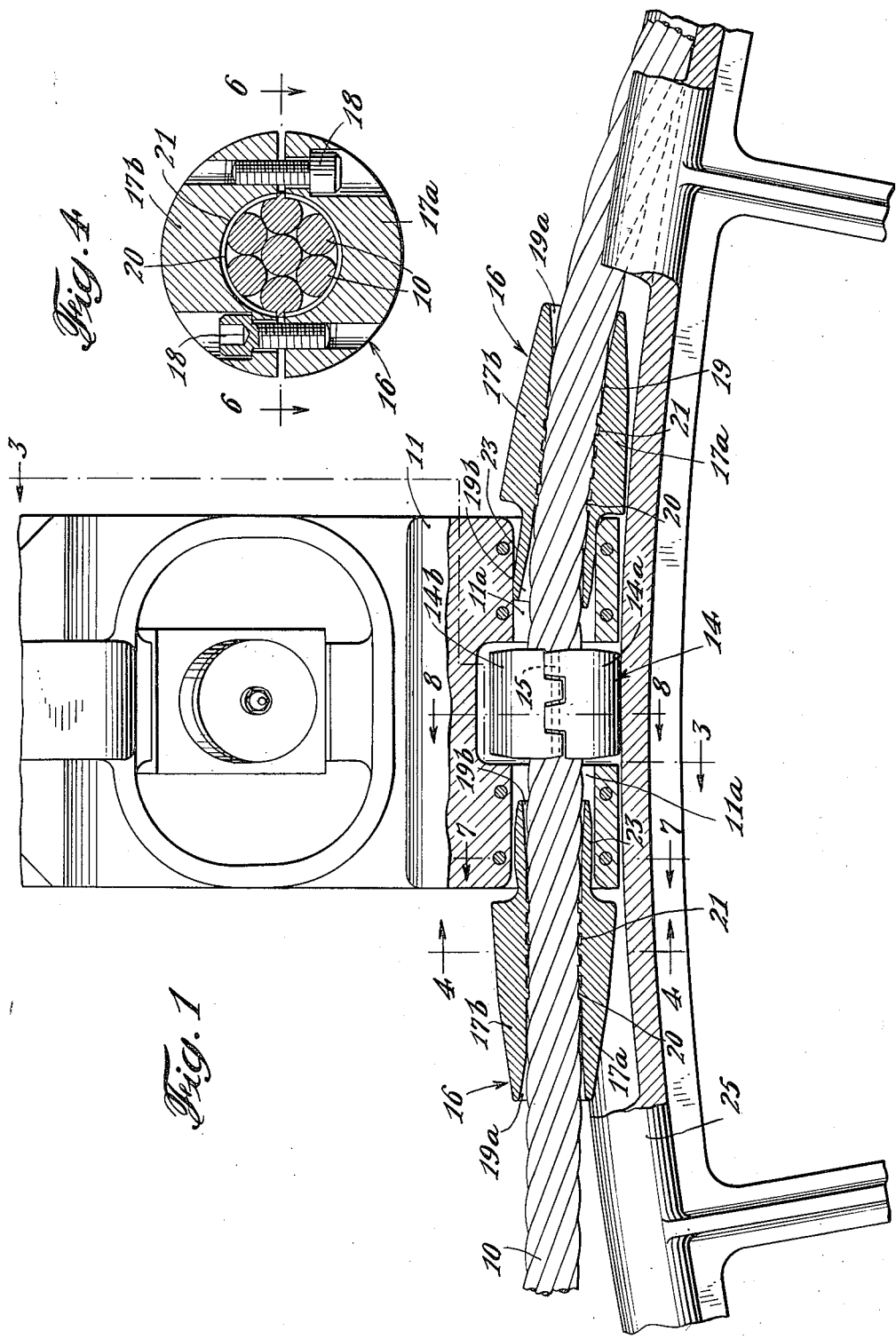
Figure 1 is a plan view partially in section of a hanger and the attachment for connecting the same to the line of the conveyor constructed in accordance with this invention.
Figure 3:
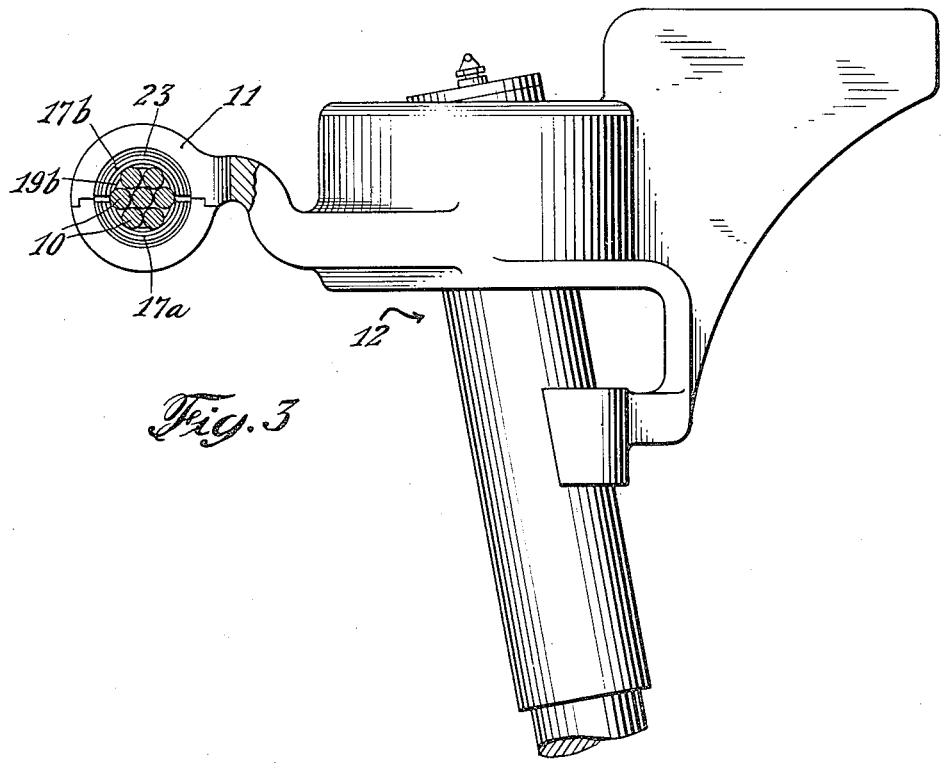
Figure 3 is a sectional view taken through the line 3—3 of Figure 1.
Figure 5:
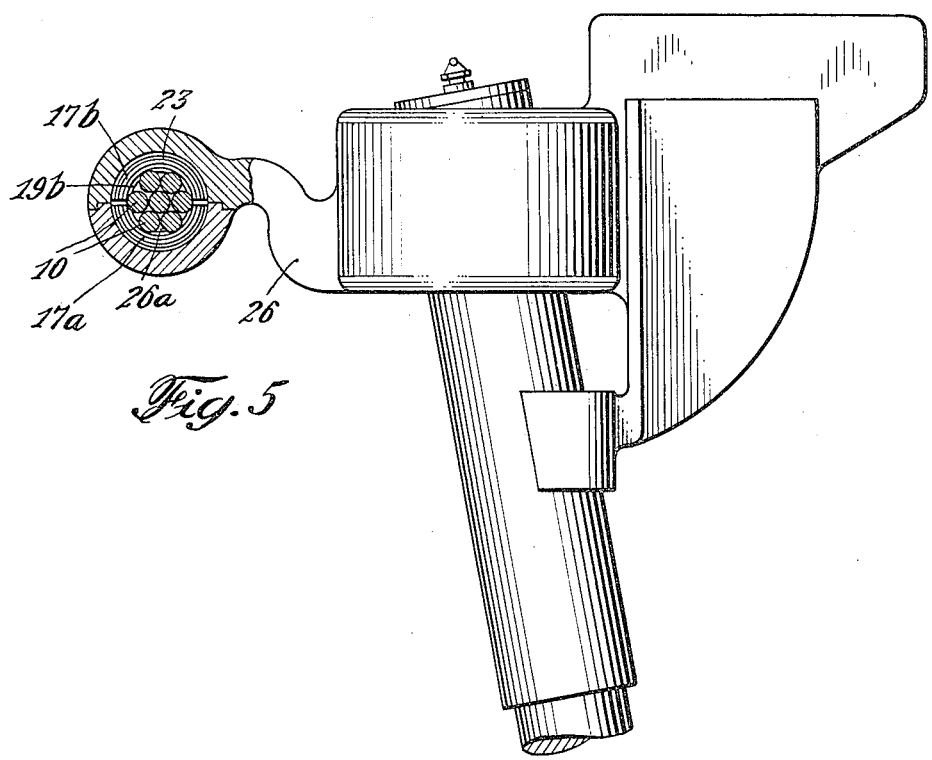
Figure 5 is a sectional view taken through the line 5—5 of Figure 2.

Referring now to the drawings in detail and in particular to Figures 1 and 3, line 10 which may be rope or cable passes through a cylindrical passageway 11a formed in the head 11 of hanger 12. While only a portion of hanger 12 is shown, it is to be understood that hanger 12 may be adapted for the portage of passengers or other loads. In the present instance the hanger is of the type which is both supported and hauled by line 10. A center clamp 14 engirdles line 10 and is seated in a central recess formed in head 11 which communicates with the cylindrical passageway formed therein. Center clamp 14 has two mating halves 14a, 14b which are keyed together and rigidly interconnected by means of elongated pins 15. Each of the clamp halves 14a, 14b has a recess 27 (Figure 8) formed in its interior surface to receive a deformable bushing 28 of copper or other suitable material. When the halves 14a, 14b are forced together to permit insertion of pins 15, bushings 28 are subjected to high compressive forces between halves 14a, 14b and line 10 with the result that line 10, bushings 28 and halves 14a, 14b become interlocked.

A pair of pilot bushings 16 are oppositely disposed on line 10. Each pilot bushing 16 has a pair of mating halves 17a, 17b rigidly connected one to the other as by bolts 18, shown most clearly in Figure 4. One of the pilot bushing halves 17a is most clearly shown in Figure 6 and has an axially extending recess 19. Each of the pilot bushing halves 17a, 17b is bored and tapped as indicated to receive bolts 18, of which there may be six. When two of the mating pilot bushing halves are joined together, the recesses 19 form a central bore, the middle portion of which is substantially cylindrical to receive and clamp line 10. Annular lands 20 and grooves 21 formed in the wall of recess 19 in the pilot bushing halves 17a, 17b provide for positive interlocking of the bushings and the lines; the latter being somewhat deformable and conforming, under the pressure exerted by bolts 18, to the contacting surface of recess 19.

From Figures 1 and 6 it is apparent that the pilot bushing or attachment halves 17a, 17b each has a main body portion 22 which is substantially frustro-conical in outline with a trunnion-like projection 23 extending from one end thereof. The other end of the main body portion 22 forms a smoothly tapered nose, the interior surface 19a of which is flared outwardly as is also the end portion 19b of the interior surface of trunnion-like projection 23. The exterior surface of projection 23 is arcuate and, as shown, is somewhat spheroidal in outline; being similar to a section of the surface of a prolate spheroid taken in the vicinity of its minor axis. A shoulder 24 formed between projection 23 and main body portion 22 is smoothly curved to match the curvature of the ends of hanger head 11 to facilitate rocking of head 11 about the trunnion-like projection 23.

As shown in Figure 7, the upper and lower portions of hanger head 11 are bolted together about center clamp 14 to form passageway 11a through which line 10 may freely pass. A pair of pilot bushing halves 17a, 17b is mounted around line 10 at each end of hanger head 11 with the trunnion-like projections 23 housed within the passageway 11a. Bolts 18 are secured and made sufficiently tight to ensure positive gripping of the line by the pilot bushings. It should be noted that the diameter of passageway 11a is preferably sufficiently large to receive line 10 and projections 23 with substantial clearance to avoid the possibility of binding between these parts and to ensure free articulation.

As is well known, line or cable conveyor systems may be supported by rollers or sheaves at the ends thereof when relatively short. In longer installations, supporting towers as well as auxiliary traction rollers or sheaves may be utilized along the system intermediate the ends thereof. The load may be suspended as shown from line 10, which line is driven and supplies motive power or traction to the hanger and load. In other types of systems the load and its hanger may be supported by rails or the like above or below line 10. In any event, the hanger 12 is provided with a head 11 which must navigate numerous rollers or sheaves, a portion of one being shown in Figure 7. An important advantage of pilot bushings 16 resides in the manner in which it serves to eliminate shock and wear of the various rollers and sheaves as well as the line. Pilot bushings 16 are preferably metallic and of noncorrosive material such as brass or the like so as to withstand extended exposure in all climates. Referring once again to Figure 1, hanger head 11 and pilot bushings 16 are shown as just entering or just leaving sheave 25. The tapered nose portion of pilot bushing 16 on entering sheave 25 serves to raise line 10 smoothly from the sheave and thereby reduces the impact of the hanger head 11 on sheave 25. As the leading pilot bushing 16 follows the curvature of sheave 25 with line 10 its trunnion-like projections 23 freely swing in the housing formed therefor by hanger head 11. It may be noted that the curvature of the outer surface of projections 23 is readily selected so that the maximum swing of the projections called for by the curvature of sheave 25 is accommodated in passageway 11a. Another important advantage of this invention resides in the increase of the radius of curvature of that part of the line 10 within the various fittings and the consequent elimination of sharp bends. This serves among other things to prolong the useful life of line 10 substantially. This effect is augmented by the flared end portions 19a, 19b as clearly shown in Figure 1.

While detrimental effects on line 10 are substantially reduced in accordance with this invention, the useful life of line 10 may be further prolonged by periodically shifting pilot bushings 16 and hanger 12 to other parts of the line. This may be readily accomplished since the pilot bushings may be readily removed as by unscrewing bolts 18 and relocated. Heretofore, known bushings were made of rubber or the like and once attached could not be thus relocated. Further, such rubber bushings required the use of heat when being attached to the line. The use of heat has the undesired effect of cooking lubricants out of the line, thereby rendering the same more likely to wear and break.

Figure 2:
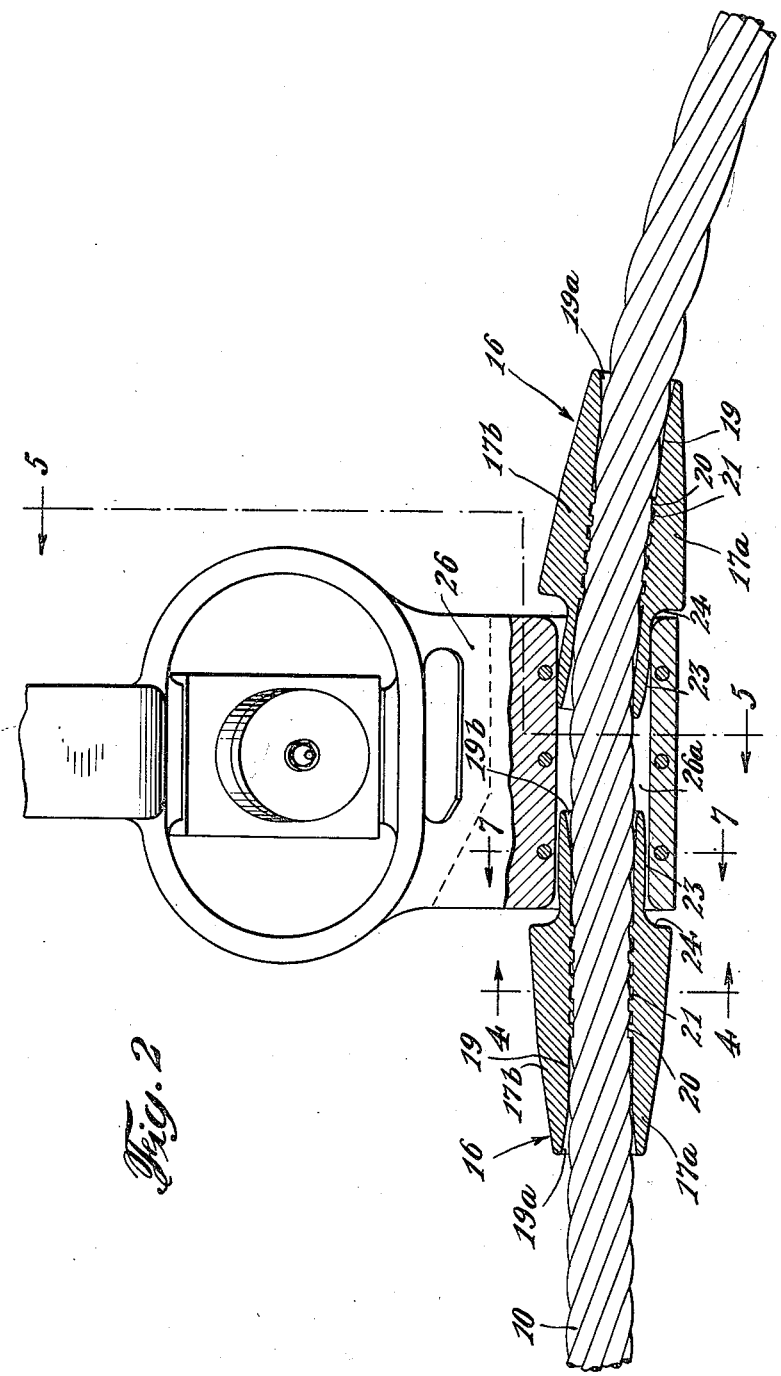
Figure 2 is a similar view of a modification thereof.

In the arrangement shown in Figure 1 the thrust of hanger 12 is delivered through head 11 to center clamp 14, thereby removing the same from and reducing the wear on pilot bushings 16. The hanger may also have a head 26 as shown in Figure 2. Here there is no recess provided into passageway 26a for the center clamp previously used. In this arrangement pilot bushings 16 are mounted as described hereinabove. The various parts function as described with one or the other of pilot bushings 16 taking the thrust from hanger head 26.

It is apparent from the foregoing that a highly useful means for making attachment to a line is provided. While the invention has been described in detail with respect to the illustrative embodiments shown, it is to be understood that various modifications thereof are possible within the scope of the invention claimed.

What is claimed is:

1. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line and secured thereto adjacent to either end of said head, said pilot bushing comprising a tapered main body portion with the larger end thereof presented toward said head, and a trunnion-like projection extending from said end into said passageway between said line and said head.

2. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line and secured thereto adjacent to either end of said head, said pilot bushing comprising a tapered main body portion with the larger end thereof presented toward said head, and a trunnion-like projection extending from said end into said passageway between said line and said head, and the outer surface of said projection facing said head being arcuate.

3. In a conveyor system, a sheave, a line in contact with said sheave, a hanger for ataching a load, a hanger head connected to said hanger and having a substantially cylindrical passgeway through which said line passes with said head encircling said line, a pilot bushing engirdling said line and secured thereto adjacent to either end of said head, said pilot bushings each comprising a substantially frustro-conical main body portion with the end thereof of largest diameter presented toward said head, and a trunnion-like projection extending from said end in said passageway between said line and said head, and the outer surface of said projection facing said head being substantially spheroidal.

4. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line and secured thereto adjacent to either end of said head, said pilot bushings each comprising a substantially frustro-conical main body portion with the end thereof of largest diameter presented toward said head, and a trunnion-like projection extending from said end in said passageway between said line and said head and supporting said head, the outer surface of said projection facing said head being substantially spheroidal in shape, and there being substantial clearance between said projection and the surface of said head defining said passageway so that said projections may swing relative to said head when traversing said sheave.

5. In a conveyor system, a sheave, a line in contact with said sheave, a hanger for attaching a load, a hanger head connected to said hanger and having a substantially cylindrical passageway through which said line passes with said head encircling said line, said head having a recess formed therein intermediate the ends of said passageway and communicating therewith, a center clamp engirdling said line and secured thereto, said center clamp being of larger diameter than said passageway and extending in said recess, a pilot bushing engirdling said line and secured thereto adjacent to either end of said head, said pilot bushings each comprising a substantially frustro-conical main body portion with the end thereof of largest diameter presented toward said head, and a trunnion-like projection extending from said end into said passageway between said line and said head.

6. In a conveyor system, a sheave, a line in contact with said sheave, a hanger for attaching a load, a hanger head connected to said hanger and having a substantilly cylindrical passageway through which said line passes with said head encircling said line, said head having a recess formed therein intermediate the ends of said passageway and communicating therewith, a center clamp engirdling said line and secured thereto, said center clamp being of larger diameter than said passageway and extending in said recess, a pilot bushing engirdling said line and secured thereto adjacent to either end of said head, said pilot bushings each comprising a substantially frustro-conical main body portion with the end thereof of largest diameter presented toward said head, and a trunnion-like projection extending from said end into said passageway between said line and said head, and the outer surface of said projection facing said head being substantially spheroidal in shape.

7. In a conveyor system, a sheave, a line in contact with said sheave, a hanger for attaching a load, a hanger head connected to said hanger and having a substantially cylindrical passageway through which said line passes with said head encircling said line, said head having a recess formed therein intermediate the ends of said passageway and communicating therewith, a center clamp engirdling said line and secured thereto, said center clamp being of larger diameter than said passageway and extending in said recess, a pilot bushing engirdling said line and secured thereto adjacent to either end of said head, said pilot bushings each comprising a substantially frustro-conical main body portion with the end thereof of largest diameter presented toward said head, and a trunnion-like projection extending from said end into said passageway between said line and said head and supporting said head, the outer surface of said projection facing said head being substantially spheroidal in shape, and there being substantial clearance between said projection and the surface of said head defining said passageway so that said projections may swing relative to said head when traversing said sheave.

8. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line and secured thereto adjacent to either end of said head, said pilot bushings each comprising a pair of mating halves detachably secured together and forming a substantially frustro-conical main body portion with the end thereof of largest diameter presented toward said head, and a trunnion-like projection extending from said end into said passageway between said line and said head.

9. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line adjacent to either end of said head, said pilot bushings each comprising a pair of mating halves detachably secured together and forming a substantially cylindrical bore with said line extending through said bore, said line being compressively engaged by said halves and secured thereby, said halves forming a substantially frustro-conical main body portion with the end thereof of largest diameter presented toward said head, and a trunnion-like projection extending from said end into said passageway between said line and said head.

10. In a conveyor system, a sheave, a line in contact with said sheave, a hanger for attaching a load, a hanger head connected to said hanger and having a substantially cylindrical passageway through which said line passes with said head encircling said line, a pilot bushing engirdling said line adjacent to either end of said head, said pilot bushings each comprising a pair of mating halves with each half having an elongated recess formed along one surface thereof, means detachably securing said halves together with the surfaces forming said recesses presented toward each other and forming an open ended substantially cylindrical passageway, said line being clamped between said halves and extending through said passageway, said surfaces defining said last mentioned passageway being flared outwardly adjacent the ends thereof, said halves forming a substantially frustro-conical main body portion with the end thereof of largest diameter presented toward said head, and a trunnion-like projection extending from said end into said passageway between said line and said head, and the outer surface of said projection facing said head being substantially spheroidal in shape.

11. As an article of manufacture a pilot bushing for threading the line of a conveyor system with a hanger attached thereto past a sheave with which the line is in contact, comprising a pair of similar elongated members each having a surface defining an open ended recess with said recesses forming an open ended substantially cylindrical bore when said halves are secured together and adapted to receive therethrough and clampingly engage said line, said halves together forming a tapered main body portion, and matching trunnion-like projections extending axially from the wider end of said halves, and said projections extending transversely substantially less than the wider end of said main body portion.

12. A pilot bushing as described in claim 11 wherein the portions of the surfaces defining the end portions of said substantially cylindrical bore are flared outwardly away from the axis of the passageway.

References Cited in the file of this patent

UNITED STATES PATENTS

| | | |
|---|---|---|
| 2,228,391 | Hunziker | Jan. 14, 1941 |
| 2,238,265 | Hunziker | Apr. 15, 1941 |
| 2,250,339 | Whittum | July 22, 1941 |